United States Patent [19]

Taniguchi et al.

[11] 4,287,311

[45] Sep. 1, 1981

[54] GLUE FOR WOOD LAMINATING COMPRISING THERMOSETTING CONDENSATION RESIN AND MODIFIED PVA

[75] Inventors: Yasuo Taniguchi; Toshiharu Ike; Hideo Nakaya, all of Ohmi, Japan

[73] Assignee: Denki Kagaku Kogyo Kabushiki Kaisha, Tokyo, Japan

[21] Appl. No.: 90,026

[22] Filed: Oct. 31, 1979

[30] Foreign Application Priority Data

Oct. 31, 1978 [JP] Japan .............................. 53-133240

[51] Int. Cl.$^3$ ........................................... C08L 61/32
[52] U.S. Cl. ..................................... 525/58; 156/327; 156/335; 260/29.3; 260/29.4 UA; 428/528; 428/529

[58] Field of Search ......... 525/58; 260/29.3, 29.4 UA

[56] References Cited

U.S. PATENT DOCUMENTS

| 2,111,006 | 3/1938 | Robie | 51/280 |
| 2,392,574 | 1/1946 | Brown | 525/58 |
| 3,617,429 | 11/1971 | Le Blanc | 525/58 |
| 3,734,918 | 5/1973 | Mayer et al. | 260/29.3 |
| 3,905,921 | 9/1975 | Cone et al. | 260/29.3 |

Primary Examiner—Theodore E. Pertilla
Attorney, Agent, or Firm—Stevens, Davis, Miller & Mosher

[57] ABSTRACT

A glue for wood, comprising a thermosetting condensation resin and a modified polyvinyl alcohol having a hydrophobic group in the side chain thereof.

5 Claims, No Drawings

GLUE FOR WOOD LAMINATING COMPRISING THERMOSETTING CONDENSATION RESIN AND MODIFIED PVA

BACKGROUND OF THE INVENTION

1. Field of the Invention

This invention relates to a glue for wood, and more particularly to a glue for wood, comprising a modified polyvinyl alcohol having a hydrophobic group.

2. Description of the Prior Art

Generally, glues for wood are compositions which are obtained by causing thermosetting condensation resins such as, for example, urea-formaldehyde resin, melamine-formaldehyde resin, and phenolic resin to incorporate therein extenders and fillers such as wheat flour, starch, wood flour, nutshell flour, talc and clay. When such a glue is spread on a veneer for plywood, water contained in the glue permeates into the veneer or passes into the ambient air so that the glue starts drying up and setting before it undergoes thermal compression. Generally, this phenomenon is called dried out glueline, dry adhesion or presetting (hereinafter referred to collectively as "dryout phenomenon"). When the dryout phenomenon occurs during the production of plywood by union of veneers, the glue in use loses its adhesive strength. In an extreme case, the loss of the adhesive strength can be so serious as to induce layer delamination in the produced plywood. There is another possibility that not merely water but also the resin contained in the glue will permeate into the veneers. This phenomenon, called "glueline washout," entails loss of the adhesive force and layer delamination.

For the prevention of the phenomena of "dryout" and "glueline washout," measures such as (1) increasing the amount of glue applied, (2) increasing the water content of veneers to preclude the otherwise possible permeation, (3) causing the amounts of extender and filler contained in the glue to be increased beyond their usually accepted contents and thereby heightening the viscosity of the glue, (4) adding a cellulose derivative to the glue, and (5) adding a polyacrylic acid to the glue have been known to be effective. These measures have demerits of their own: The measure (1) is deficient in economy, the measure (2) suffers from poor capacity for temporary adhesion and, consequently, tends to entail development of contractions and warps in the plywood obtained by adhesion of veneers, the measure (3) results in a degradation of the adhesive force in water, the measure (4) impairs the adhesive force in water and the measure (5), though effective in improving the glue's resistance to the dryout phenomenon, fails to preclude the washout phenomenon and impairs the other physical properties.

SUMMARY OF THE INVENTION

For the purpose of overcoming the difficulties mentioned above, the present invention provides a glue for wood which has a specific modified polyvinyl alcohol incorporated into a conventional glue based on a thermosetting condensation resin and which, consequently, is capable of resisting the dryout phenomenon and excellent in adhesiveness.

This invention, therefore, relates to a glue for wood, which comprises a thermosetting glue and 0.2 to 5% by weight, based on the aforementioned thermosetting glue, of a modified polyvinyl alcohol having a hydrophobic group in the side chain thereof.

DETAILED DESCRIPTION OF PREFERRED EMBODIMENT

Generally, a glue for wood is produced by incorporating an extender, a filler, water and a setting agent to a thermosetting condensation resin solution. The present invention provides a novel glue which has such a conventional glue further incorporate therein a modified polyvinyl alcohol (hereinafter referred to as "modified PVA") having a hydrophobic group in the side chain thereof.

The expression "thermosetting condensation resin" as used in the present invention refers to a resin of the type which undergoes condensational setting upon exposure to heat. Examples of such thermosetting condensation resins include urea-formaldehyde resins, melamine-formaldehyde resins, melamine-urea-formaldehyde resins, phenol-formaldehyde resins, melamine-phenol-formaldehyde resins and alkylphenol-phenol-formaldehyde resins.

The expression "modified PVA having a hydrophobic group in the side chain thereof" as used in the present invention refers to a PVA of the type which is obtained by copolymerizing vinyl acetate with a monomer having a hydrophobic alkyl group in the side chain thereof and thereafter hydrolyzing the vinyl acetate moiety of the resultant copolymer to a degree of not less than 75 mols% or to a PVA of the type which is obtained by either esterifying or etherifying the hydroxyl group of a PVA. Examples of monomers which possess a hydrophobic group in the side chain and are used in the aforementioned copolymerization include vinyl esters of aliphatic acids such as propionic acid, valeic acid, caprylic acid, laurylic acid, stearic acid and versatic acid; alkyl vinyl ethers such as methyl vinyl ether, normal butyl ether, isobutyl vinyl ether, 2-ethylhexyl vinyl ether, octyl vinyl ether, lauryl vinyl ether and cetyl vinyl ether; and $\alpha$-olefins such as propylene, butene-1, hexene-1, heptene-1, octene-1 and dodecene-1. The amount of the aforementioned modified PVA to be incorporated into the thermosetting condensation resin solution having a solids content of from 40 to 60% by weight is in the range of from 0.2 to 5% by weight, preferably from 0.5 to 3% by weight. The incorporation of the modified PVA is accomplished by adding either in its original form of powder or in the form of aqueous solution. Examples of extenders and fillers usable for this invention are wheat flour, starch, wood flour, nutshell flour, talc and clay. The extender and the filler are added in a total amount in the range of from 10 to 30% by weight based on the thermosetting condensation resin solution. Water which is used as an extender is added in an amount in the range of from 0 to 20% by weight based on the thermosetting condensation resin solution. The setting agent is used for the purpose of acceleration of the setting of a urea- or melamine-based resin such as urea-formaldehyde resin or melamine-formaldehyde resin. Examples of the setting agent are ammonium chloride and ammonium sulfate. The setting agent is added in an amount in the range of from 0.1 to 2% by weight based on the resin solution.

It is known that the glue using a modified PVA as a main component can be manufactured by either a pre-addition method or a post-addition method. In the case of the glue of this invention, although both methods can be effectively used, the post-addition method proves to be more advantageous than the pre-addition method in terms of efficiency of the addition and convenience of the manufacturing procedure.

When plywood is manufactured by using the glue of this invention, there can be obtained plywood of improved adhesiveness and wood failure and high tenacity without entailing the dryout phenomenon and without reference to the length of the time spent in piling veneers one on top of another, the length of the layup time after piling veneers or the height of the temperature of veneers.

Now, the present invention will be described specifically with reference to working examples. It should be noted that this invention is not limited to these examples. Wherever parts are mentioned hereinafter, they are meant to be based on weight.

EXAMPLE 1

(A) Preparation of modified PVA - In liquid methanol, vinyl acetate and vinyl versatate (produced by Shell Oil and marketed under trademark "Veova-10") were polymerized by an ordinary method and the resultant polymer solution was heated to have the unreacted vinyl acetate expelled with methanol vapor. The methanol solution of the vinyl acetate-vinyl versatate copolymer was saponified with caustic soda to afford a modified PVA (I) containing 0.77 mols% of vinyl versatate and having a saponification degree of 86.9 mol% and a degree of polymerization of 1570.

(B) Preparation of urea resin solution—A mixed solution was obtained by blending 200 parts of an aqueous 37% formalin solution, 100 parts of urea and 2.7 parts of a polyvinyl alcohol having an average polymerization degree of 1760 and a saponification degree of 99.8 mol% and then adjusted to pH 8 by addition thereto of a mixed solution of acetic acid and aqua ammonia. The mixed solution was heated to 95° C. in 30 minutes and then held at 95° C. for 100 to 120 minutes to permit the reaction to proceed, with the first sign of a cloudy suspension appearing in the solution taken as the end point of the reaction. The solution was adjusted to pH 8 by addition of an aqueous caustic soda solution and mixed with 33 parts of urea and 10 parts of melamine. The resultant mixture was again held at 95° C. for 30 minutes to induce reaction of the reactants, then adjusted to pH 8 with an aqueous caustic soda solution and then left to cool off.

(C) Manufacture of glue—A glue was manufactured by combining the components indicated below in the amounts correspondingly shown below.

Urea resin solution: 100 parts
Wheat flour: 21 parts
Water: 17 parts
Ammonium chloride: 1 part
Modified PVA (I): 1 part (D) Production of plywood—Plywood was produced by piling three red lauan veneers measuring 0.8 mm, 1.6 mm and 0.8 mm in thickness respectively and 15 cm×15 cm equally in area and having a water content of 5 to 7%, with the glue prepared in (C) above applied to the interfaces at a rate of 3.5 g/225 cm² (single side base), then cold pressing the resultant pile under 10 kg/cm² for 15 minutes and hot pressing it under 10 kg/cm² for 60 seconds at a temperature of 115° C. In this case, the veneers were piled up immediately after application of the glue to their interfaces.

The production of plywood described above was tried by varying the open assembly time (T1), namely the interval between the time the glue was applied to the interfaces and the time the pile of veneers was fed into the cold press, and the closed assembly time (T2), namely the interval between the time the pile was removed from the cold press and the time the pile was fed into the hot press.

The plywoods obtained in the varying test runs were tested for physical properties. The results were as shown in Table 1 below.

TABLE 1

| Assembly time (min.) | T1 | 5 | 30 | 60 | 120 | 5 | 5 | 5 |
|---|---|---|---|---|---|---|---|---|
| | T2 | 5 | 5 | 5 | 5 | 30 | 60 | 120 |
| Temperature of veneer (°C.) | During glue application | | | | 35 | | | |
| | During piling work and laying up | | | | 30 | | | |
| Under normal conditions | Adhesive strength (kg/cm²) | 12.8 | 12.6 | 12.5 | 12.8 | 13.2 | 12.7 | 13.0 |
| | Wood failure (%) | 100 | 100 | 100 | 100 | 100 | 100 | 100 |
| Dipped in hot water | Adhesive strength (kg/cm²) | 10.3 | 10.4 | 10.4 | 19.9 | 10.5 | 10.2 | 10.0 |
| | Wood failure (%) | 43 | 40 | 36 | 35 | 43 | 38 | 35 |

COMPARATIVE EXAMPLE 1

The procedure of Example 1 was repeated, except the use of the modified PVA (I) was omitted. The results were as shown in Table 2.

TABLE 2

| Assembly time (min.) | T1 | 5 | 30 | 60 | 120 | 5 | 5 | 5 |
|---|---|---|---|---|---|---|---|---|
| | T2 | 5 | 5 | 5 | 5 | 30 | 60 | 120 |
| Temperature of veneer (°C.) | During glue application | | | | 35 | | | |
| | During piling work and laying up | | | | 30 | | | |
| Under normal conditions | Adhesive strength (kg/cm²) | 11.6 | 10.5 | 10.2 | 9.5 | 10.3 | 9.8 | 10.2 |
| | Wood failure (%) | 100 | 100 | 100 | 98 | 100 | 100 | 96 |
| Dipped in hot water | Adhesive strength (kg/cm²) | 10.1 | 8.5 | 8.1 | 7.9 | 9.4 | 8.7 | 8.1 |
| | Wood failure (%) | 45 | 30 | 22 | 4 | 32 | 13 | 9 |

EXAMPLE 2

Preparation of modified PVA—By following the procedure of Example 1, vinyl acetate and lauryl vinyl ether were copolymerized and then saponified to afford a modified PVA (II) containing 0.45 mol% of lauryl vinyl ether and having a polymerization degree of 1470 and a saponification degree of 87.7 mol%.

Preparation of phenol resin solution—116 parts of an aqueous 50% caustic soda solution was portionwise added to a mixture of 528 parts of an aqueous 37% formalin solution and 384 parts of phenol. During the addition, the temperature of the mixed solution rose owing to the heat of neutralization. Thus, the addition was continued while the reaction system was suitably cooled so as to keep the temperature from rising above 50° C. When the solution became transparent and ceased to evolve the heat of neutralization, the temperature of the solution was elevated to 90° C. in 40 to 50 minutes. At this temperature, the solution was allowed to undergo condensation for 60 minutes and then cooled. The resultant solution was found to have a solids content of 52% by weight, a viscosity of 580 cps (as determined with a Brookfield viscosimeter at 25° C., 30 rpm) and a pH 11.3.

Manufacture of glue—A glue was manufactured by combining the components indicated below in the amounts correspondingly shown below.

Phenol resin solution: 100 parts
Wheat flour: 10 parts
Water: 10 parts
Modified PVA (II): 1 part The glue thus manufactured was found to have a viscosity of 5000 cps (as determined with a Brookfield viscosimeter at 25° C., 30 rpm). Plywood was produced by following the procedure of Example 1, except that the glue manufactured in this example was used, the temperature of veneers used for the production of plywood was changed to 30° C. and 50° C. and the cold pressing was performed at 10 kg/cm$^2$ for five minutes and the hot pressing at 10 kg/cm$^2$ for three minutes at 135° C.

Of the various items of test conducted on the produced plywoods, the test by repeated boiling was carried out in accordance with U.S. Product Standard PS1-74. The results of the test were as shown in Table 3 below.

TABLE 3

| Assembly time (min.) | | T1 | 5 | 30 | 60 | 120 | 5 | 5 | 5 |
|---|---|---|---|---|---|---|---|---|---|
| | | T2 | 5 | 5 | 5 | 5 | 30 | 60 | 120 |
| Temperature of veneer during piling work and laying up | | °C. | | | | 30 | | | |
| Temperature of veneer during glue application (°C.) | Under normal conditions | Adhesive strength (kg/cm$^2$) | 12.1 | 12.6 | 12.4 | 12.1 | 12.6 | 13.6 | 13.6 |
| | | Wood failure (%) | 96 | 98 | 100 | 100 | 98 | 100 | 95 |
| 30 | After repeated boiling | Adhesive strength (kg/cm$^2$) | 12.4 | 12.6 | 12.6 | 11.7 | 13.3 | 13.1 | 12.0 |
| | | Wood failure (%) | 93 | 90 | 91 | 87 | 90 | 85 | 85 |
| | Resistance to dryout phenomemon (min.) | | | | | 73 | | | |
| | Under normal conditions | Adhesive strength (kg/cm$^2$) | | | | | | | |
| | | Wood failure (%) | | | | | | | |
| 50 | After repeated boiling | Adhesive strength (kg/cm$^2$) | 12.4 | 12.3 | 11.9 | 12.1 | | | |
| | | Wood failure (%) | 82 | 75 | 78 | 77 | | | |
| | Resistance to dryout phenomenon (min.) | | | | | 67 | | | |

COMPARATIVE EXAMPLE 2

The procedure of Example 2 was repeated, except that the addition of the modified PVA (II) was omitted. The results were as shown in Table 4 below.

TABLE 4

| Assembly time (min.) | | T1 | 5 | 30 | 60 | 120 | 5 | 5 | 5 |
|---|---|---|---|---|---|---|---|---|---|
| | | T2 | 5 | 5 | 5 | 5 | 30 | 60 | 120 |
| Temperature of veneer during piling work and laying up | | °C. | | | | 30 | | | |
| Temperature of veneer during glue application (°C.) | Under normal conditions | Adhesive strength (kg/cm$^2$) | 12.1 | 11.8 | 11.6 | 11.1 | 11.9 | 10.9 | 11.4 |
| | | Wood failure (%) | 91 | 94 | 94 | 96 | 93 | 85 | 80 |
| 30 | After repeated boiling | Adhesive strength (kg/cm$^2$) | 11.2 | 10.8 | 10.3 | 10.6 | 11.3 | 10.8 | 10.7 |
| | | Wood failure | 82 | 75 | 68 | 68 | 66 | 67 | 69 |

TABLE 4-continued

| Assembly time (min.) | T1 | 5 | 30 | 60 | 120 | 5 | 5 | 5 |
|---|---|---|---|---|---|---|---|---|
| | T2 | 5 | 5 | 5 | 5 | 30 | 60 | 120 |

| | | (%) | | | | | | | |
|---|---|---|---|---|---|---|---|---|---|
| | Under normal conditions | Adhesive strength (kg/cm$^2$) | | | | | | | |
| | | Wood failure (%) | | | | | | | |
| 50 | After repeated boiling | Adhesive strength (kg/cm$^2$) | 10.3 | 9.5 | 9.1 | 8.9 | | | |
| | | Wood failure (%) | 60 | 65 | 43 | 35 | | | |
| | Resistance to dryout phenomenon (min.) | | | | 14 | | | | |

COMPARATIVE EXAMPLE 3

The procedure of Example 2 was followed, except that a PVA having a polymerization degree of 2030 and a saponification degree of 87.5 mol% was used in the place of the modified PVA (II). The glue used in this case had a viscosity of 4400 cps (at 25° C., 30 rpm). The results were as shown in Table 5 below.

TABLE 5

| Assembly time (min.) | T1 | 5 | 30 | 60 | 120 |
|---|---|---|---|---|---|
| | T2 | 5 | 5 | 5 | 5 |
| Temperature of veneer during piling work and laying up | °C. | | | 30 | |
| Temperature of veneer during glue application (°C.) 50 | After repeated boiling | Adhesive strength (kg/cm$^2$) | 11.5 | 10.8 | 10.2 | 10.0 |
| | | Wood failure (%) | 78 | 62 | 58 | 35 |
| Resistance to dryout phenomenon (min.) | | | | 27 | |

EXAMPLE 3

The procedure of Example 2 was followed, except that the glue which was prepared by varying the amount of the modified PVA (II) added was used, the time of piling between the time the glue was applied and the time the pile of veneers was subjected to the cold pressing was changed to 5 minutes and the time of piling between the time the pile was discharged from the cold press and the time it was fed into the hot press was changed to 60 minutes. The results were as shown in Table 6.

TABLE 6

| Glue composition (parts) | Phenol resin | 100 | 100 | 100 | 100 |
|---|---|---|---|---|---|
| | Wheat flour | 10 | 10 | 10 | 10 |
| | Water | 10 | 10 | 10 | 10 |
| | Modified PVA (II) | 0 | 0.5 | 1.0 | 1.5 |
| | Carboxymethyl cellulose | — | — | — | — |
| Viscosity of glue (cps) | | 2500 | 3000 | 4500 | 6000 |
| Assembly time (min.) | T1 | | 5 | | |
| | T2 | | 60 | | |
| Temperature of veneer during glue application (°C.) | | | 30 | | |
| Temperature of veneer during piling work and laying up (°C.) | | | 30 | | |
| Repeated boiling | Adhesive strength (kg/cm$^2$) | 10.1 | 11.9 | 12.9 | 13.7 |

TABLE 6-continued

| Wood failure (%) | 68 | 75 | 85 | 93 |
|---|---|---|---|---|

COMPARATIVE EXAMPLE 4

The procedure of Example 3 was followed, except that carboxymethyl cellulose (produced by Daiichi Kogyo Seiyaku Co., Ltd., and marketed under trademark "Cellogen WSC") was used in the place of the modified PVA (II). The results were as shown in Table 7 below.

TABLE 7

| Glue composition (parts) | Phenol resin | 100 | 100 | 100 | 100 |
|---|---|---|---|---|---|
| | Wheat flour | 10 | 10 | 10 | 10 |
| | Water | 10 | 10 | 10 | 10 |
| | Modified PVA (II) | — | — | — | — |
| | Carboxymethyl cellulose | 0 | 0.5 | 1.0 | 1.5 |
| Viscosity of glue (cps) | | 2500 | 5000 | 9000 | 15000 |
| Assembly time (min.) | T1 | | 5 | | |
| | T2 | | 60 | | |
| Temperature of veneer during glue application (°C.) | | | 30 | | |
| Temperature of veneer during piling work and laying up (°C.) | | | 30 | | |
| Repeated boiling | Adhesive strength (kg/cm$^2$) | 10.1 | 9.9 | 8.6 | 8.1 |
| | Wood failure (%) | 68 | 65 | 58 | 50 |

EXAMPLE 4

Preparation of modified PVA—By following the procedure of Example 1 and using hexene-1 in the place of vinyl versatate, polymerization and saponification were performed to afford a modified PVA (III) containing 0.62 mol% of hexene and having a polymerization degree of 1550 and a saponification degree of 87.2 mol%.

Manufacture of glue—A glue was manufactured by combining the components indicated in Table 8 including the phenol resin solution obtained in Example 2.

TABLE 8

| Phenol resin solution | 65 |
|---|---|
| Wheat flour | 3 |
| Nutshell flour | 10 |
| Water | 23 |
| Aqueous 50% caustic soda solution | 5 |
| Modified PVA (III) | 0.6 |

The glue thus obtained had a viscosity of 2700 cps (at 25° C., 30 rpm).

Production of plywood—A three-ply plywood was produced by piling three veneers of Douglas fir of the U.S. origin measuring 2.6 mm each in thickness and 15 cm×15 cm each in area and having a water content of 5 to 7%, with the glue applied to the interfaces at a rate of 3.5 g/225 cm², then cold pressed under 10 kg/cm² for five minutes and hot pressed under 10 kg/cm² for three minutes at 135° C. The open assembly time, namely the interval between the time the glue was applied and the time the pile of veneers was cold pressed, was 5 minutes and the closed assembly time, namely the interval between the time the pile was discharged from the cold press and the time it was fed to the hot press, was 5 minutes, 60 minutes and 120 minutes. The results were as shown in Table 9 below.

TABLE 9

| Assembly time (min.) | | T1 | | 5 | |
|---|---|---|---|---|---|
| | | T2 | 5 | 60 | 120 |
| Temperature of veneer during glue application (°C.) | | | | 30 | |
| Temperature of veneer during piling work and laying up (°C.) | | | | 30 | |
| Repeated boiling | Adhesive strength (kg/cm²) | | 9.9 | 9.7 | 10.5 |
| | Wood failure (%) | | 88 | 88 | 95 |

COMPARATIVE EXAMPLE 5

The procedure of Example 4 was followed, except that the use of the modified PVA (III) was omitted. The results were as shown in Table 10 below.

TABLE 10

| Assembly time (min.) | | T1 | | 5 | |
|---|---|---|---|---|---|
| | | T2 | 5 | 60 | 120 |
| Temperature of veneer during glue application (°C.) | | | | 30 | |
| Temperature of veneer during piling work and laying up (°C.) | | | | 30 | |
| Repeated boiling | Adhesive strength (kg/cm² | | 8.9 | 8.3 | 8.3 |
| | Wood failure (%) | | 80 | 66 | 62 |

EXAMPLE 5

In accordance with the procedure of Example 4, a glue was manufactured by using a modified PVA (IV) containing 1.52 mol% of vinyl propionate and having a polymerization degree of 1710 and a saponification degree of 82.5 mol%. By using this glue, plywoods were made of veneers of Southern Pine in the same procedure as used in Example 4. The plywoods obtained under varying conditions were tested for adhesive strength and wood failure after repeated boiling. The results were as shown in Table 11 below.

TABLE 11

| Assembly time (min.) | | T1 | | 5 | |
|---|---|---|---|---|---|
| | | T2 | 5 | 60 | 120 |
| Temperature of veneer during glue application (°C.) | | | | 30 | |
| Temperature of veneer during piling work and laying up (°C.) | | | | 30 | |
| Repeated boiling | Adhesive strength (kg/cm²) | | 13.1 | 12.5 | 12.00 |
| | Wood failure (%) | | 95 | 96 | 93 |

EXAMPLE 6

In accordance with the procedure of Example 4, a glue was manufactured by using a modified PVA (V) containing 0.32 mol% of cetyl vinyl ether and having a polymerization degree of 1560 and a saponification degree of 92.7 mol%. By using this glue, plywoods were made of veneers of Southern Pine in the same procedure as used in Example 4. The plywoods obtained under varying conditions were tested for adhesive strength and wood failure after repeated boiling. The results were as shown in Table 12 below.

TABLE 12

| Assembly time (min.) | | T1 | | 5 | |
|---|---|---|---|---|---|
| | | T2 | 5 | 60 | 120 |
| Temperature of veneer during glue application (°C.) | | | | 30 | |
| Temperature of veneer during piling work and laying up (°C.) | | | | 30 | |
| Repeated boiling | Adhesive strength (kg/cm²) | | 13.6 | 12.7 | 12.0 |
| | Wood failure (%) | | 94 | 92 | 86 |

EXAMPLE 7

In accordance with the procedure of Example 4, a glue was manufactured by using a modified PVA (VI) containing 0.13 mol% of octene-1 and having a polymerization degree of 1120 and a saponification degree of 88.2 mol%. By using this glue, plywoods were made of veneers of Southern Pine in the same procedure as used in Example 4. The plywoods obtained under varying conditions were tested for adhesive strength and wood failure after repeated boiling. The results were as shown in Table 13 below.

TABLE 13

| Assembly time (min.) | | T1 | | 5 | |
|---|---|---|---|---|---|
| | | T2 | 5 | 60 | 120 |
| Temperature of veneer during glue application (°C.) | | | | 30 | |
| Temperature of veneer during piling work and laying up (°C.) | | | | 30 | |
| Repeated boiling | Adhesive strength (kg/cm²) | | 12.1 | 11.5 | 11.4 |
| | Wood failure (%) | | 98 | 98 | 92 |

The physical properties of plywoods obtained in the working examples cited above were determined by the methods described below.

1. The adhesive strength and the wood failure under normal conditions and under hot water test were determined by the tests specified by the Japanese Agricultural Standard. The test of plywood under hot water was performed by the following method. A test piece was dipped in water at 60°±3° C., for 3 hours, and thereafter it was cooled in cold water and tested, in its wet state, on a tensile tester.
2. The test of plywood after repeated boiling was performed in accordance with the U.S. Product Standard PSI-74. Specifically, a test piece was boiled for four hours and then dried under thoroughly ventilated ambience at 145°±5° F. for 20 hours. In this case, the total dry weight was fixed to be less than the standard water content of 8.0% by weight. The same test piece was again boiled for four hours, then cooled in cold water and tested, in its wet state, on a tensile tester with the maximum load application rate of 16 inches/min. until breakage.

3. Test for resistance to dryout phenomenon—A given red lauan veneer measuring 15 cm×15 cm in area and 1.6 mm in thickness and having a water content of 5 to 7% was kept at normal room temperature, and 3.5 g of a glue was applied to one surface of the veneer. Immediately after the application of the glue, a procedure of slightly pressing a cotton-bud against the glue-applied surface and pulling it from the surface to see if cotton fibers of the cotton bud would remain sticking to the glue was observed to determine the interval (in minutes) between the time the glue was applied to the veneer and the time the glue ceased to get hold of cotton fibers from the cotton bud.

What is claimed is:

1. A glue for wood laminating which comprises a thermosetting condensation resin and a modified polyvinyl alcohol having a hydrophobic group in the side chain thereof, said modified polyvinyl alcohol being present in an amount 0.2 to 5% by weight based on the thermosetting glue and being produced by copolymerizing vinyl acetate and a monomer having a hydrophobic alkyl group in the side chain thereof and subsequently saponifying the vinyl acetate moiety of the resultant copolymer to a degree of not less than 75 mol percent or by esterifying or etherifying hydroxyl groups of a polyvinyl alcohol, said monomer used for said copolymerization being at least one member selected from the group consisting of vinyl esters of aliphatic acids and alkyl vinyl ethers.

2. The glue for wood according to claim 1, wherein the thermosetting condensation resin is at least one member selected from the group consisting of urea-formaldehyde resins, melamine-formaldehyde resins, melamine-urea-formaldehyde resins, phenol-formaldehyde resisn, melamine-phenol-formaldehyde resins and alkyl-phenol-phenol-formaldehyde resins.

3. The glue for wood laminating according to claim 1, wherein said copolymerized monomer is selected from the group consisting of vinyl esters of propionic acid, valeric acid, caprylic acid, laurylic acid, stearic acid, and versatic acid, and alkyl vinyl ethers selected from the group consisting of methyl vinyl ether, normal butyl vinyl ether, iso-butyl vinyl ether, 2-ethylhexyl vinyl ether, octyl vinyl ether, lauryl vinyl ether and cetyl vinyl ether, and α-olefines selected from the group consisting of propylene, butene-1, hexene-1, heptene-1, octene-1 and dodecene-1.

4. The glue for wood laminating according to claim 3, wherein the modified polyvinyl alcohol having a hydrophobic group in the side chain is obtained by copolymerizing vinyl acetate and a monomer having said hydrophobic alkyl group in the side chain thereof and subsequently saponifying the vinyl acetate moiety of the resultant copolymer to a degree of not less than 75 mol percent.

5. The glue for wood laminating according to claim 3, wherein the modified polyvinyl alcohol having a hydrophobic group in the side chain is obtained by esterifying or etherifying the hydroxyl group of a polyvinyl alcohol.

* * * * *